United States Patent

[11] 3,557,815

| [72] | Inventor | Jeffrey M. Lazar |
| | | South St. Paul, Minn. |
| [21] | Appl. No. | 663,821 |
| [22] | Filed | Aug. 28, 1967 |
| [45] | Patented | Jan. 26, 1971 |
| [73] | Assignee | Honeywell Inc. |
| | | Minneapolis, Minn. |
| | | a corporation of Delaware |

[54] CONTROL APPARATUS
4 Claims, 1 Drawing Fig.

| [52] | U.S. Cl. | 137/81.5 |
| [51] | Int. Cl. | F15c 1/12 |
| [50] | Field of Search | 137/81.5 |

[56] References Cited
UNITED STATES PATENTS

| 3,185,166 | 5/1965 | Horton et al. | 137/81.5 |
| 3,217,727 | 11/1065 | Spyropoulos | 137/81.5 |
| 3,219,271 | 11/1965 | Bauer | 137/81.5X |
| 3,223,101 | 12/1965 | Bowles | 137/81.5 |
| 3,228,410 | 1/1966 | Warren et al. | 137/81.5 |
| 3,443,573 | 5/1969 | Posingies | 137/81.5 |
| 3,443,574 | 5/1969 | Posingies | 137/81.5 |

*Primary Examiner*—Samuel Scott
*Attorneys*—Charles J. Ungemach, Ronald T. Reiling and Charles L. Rubow ABSTRACT: Apparatus having a proportional fluidic amplifier and a bistable amplifier for converting a proportional fluidic signal to a digital fluidic signal.

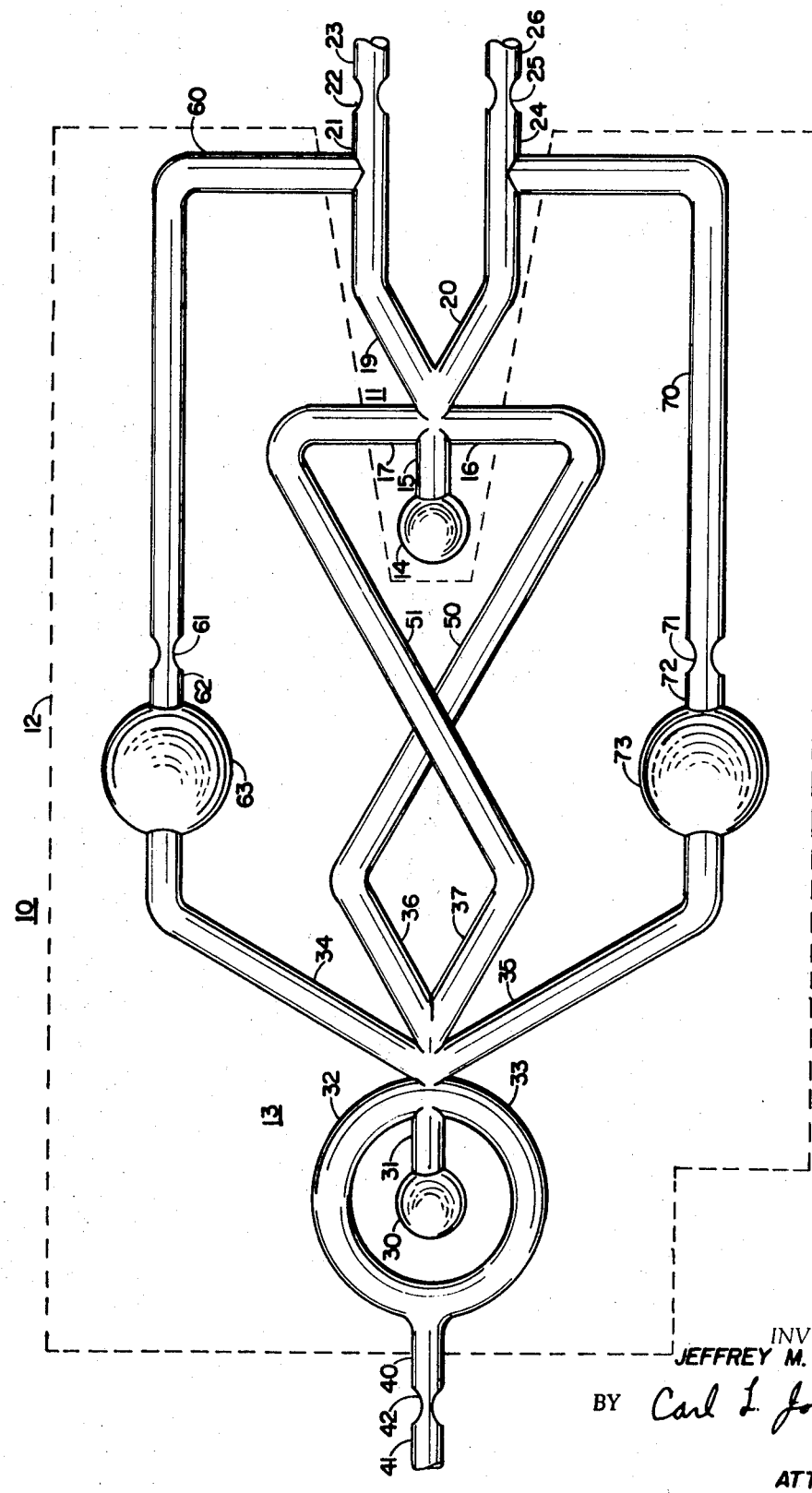

CONTROL APPARATUS

BACKGROUND OF THE INVENTION

This invention relates broadly to fluidic apparatus, and more specifically, to fluidic apparatus for converting a proportional input signal into a digital output signal.

The invention herein described was made in the course of or under a contract, or subcontract thereunder, with the Department of the Air Force.

In building fluidic systems it is often necessary to utilize devices having a proportional fluidic output signal and devices having a digital fluidic output signal in the same system. These proportional output signals and digital output signals generally must be summed. Since a proportional signal is not easily summed with a digital signal, the signals must be converted to all digital signals or to all proportional signals. Proportional signals are generally slower than digital signals. Proportional signals travel at a velocity of the fluid flowing through a transmission line, but digital signals travel at the velocity of the fluid flowing through a transmission line plus the velocity of the sound of the fluid in the transmission line. Therefore, to obtain a faster response it is desirable to convert proportional output signals into digital output signals. I have invented an apparatus that readily converts a proportional input signal to a digital output signal.

SUMMARY OF THE INVENTION

Briefly, the invention comprises a bistable fluidic amplifier having controllable negative feedback means which causes the bistable fluidic amplifier to oscillate at a frequency dependent upon a variable proportional signal applied to the feedback means.

BRIEF DESCRIPTION OF THE DRAWING

The drawing is a variable schematic gain illustration of a fluidic apparatus embodying my invention.

DESCRIPTION OF THE PREFERRED EMBODIMENT

Referring to the drawing, reference numeral 10 designates a fluidic apparatus that comprises my proportional-to-frequency converter system (which may also be called a proportional-to-digital converter.) The proportional-to-frequency converter is comprised of a bistable amplifier 11 and a feedback network 12 (shown within the dashed lines). The bistable amplifier 11 is well known in the art and comprises a power chamber 14, a power nozzle 15, a first control port 16, a second control port 17, a first outlet 19, and a second outlet 20. Connected to the outlet 19 through a passage 21 and a fluidic restriction 22 is the outlet passage 23. Similarly, connected to the outlet 20 through a passage 24 and a fluidic restriction 25 is a second outlet passage 26. The feedback network includes a proportional fluidic amplifier 13, the gain of which is varied in response to the proportional input control signal. Such an amplifier is more thoroughly described in the Pat. application of Richard A. Evans, Ser. No. 578,006 which was filed on Sept. 8, 1966, now U.S. Pat. No. 3,451,408, and assigned to the same assignee as the present invention.

The proportional fluidic amplifier 13 has a power chamber 30, a power nozzle 31, a first gain-changing control port 32, a second gain-changing control port 33, a third control port 34, a fourth control port 35, a first outlet 36, and a second outlet 37. Gain-changing control ports 32 and 33 connect to a passage 40 which is connected to a passage 41 through a restriction 42.

The outlet 36 of the proportional fluidic amplifier 13 connects to the control port 16 of the bistable amplifier 11 through a passage 50, and the outlet 37 of the proportional fluidic amplifier 13 similarly connects to the control port 17 of the bistable amplifier 11 through a passage 51.

The outlet 19 of the bistable amplifier 11 connects to the third control port 34 of the proportional fluidic amplifier 13 through a passage 60, a fluidic resistance 61, a passage 62, and a fluidic capacitance chamber 63. Similarly, outlet 20 of the bistable amplifier 11 connects to the control port 35 of the proportional fluidic amplifier 13 through a passage 70, a fluidic resistance 71, a passage 72, and a fluidic capacitance chamber 73.

OPERATION

Briefly, the apparatus produces a digital output signal of varying frequency at passages 23 and 26 in response to a varying proportional input control signal at passage 41.

The varying proportional input control signal changes to a varying digital output signal when a negative feedback signal is supplied to the bistable amplifier 11. This negative feedback signal causes the bistable amplifier 11 to oscillate. Changing the negative feedback signal changes the frequency of oscillation of the bistable amplifier 11.

For purposes of illustrating the operation of the system, assume that the fluid from the power nozzle 15 is flowing into the outlet 19 of a bistable amplifier 11. A portion of the fluid in the outlet 19 flows into the outlet passage 23 through the passage 21 and through the fluidic restriction 22. The fluidic restriction 22 causes some of the fluid within the outlet 19 to flow through the passage 60, through the fluidic resistance 61, through the passage 62, and into the fluidic capacitance chamber 63. The fluidic resistance 61 limits the rate at which the pressure increases within the fluidic capacitance chamber 63; that is, the pressure within the fluidic capacitance chamber 63 gradually increases since the fluidic resistance 61 limits the rate at which the fluid enters the fluidic capacitance chamber 63. As the pressure of the fluid within the fluidic capacitance chamber 63 increases, additional fluid flows from the fluidic capacitance chamber 63 into the third control port 34 of the proportional fluidic amplifier 13. This additional fluid produces a stronger pressure signal at the control port 34 than at control port 35 and diverts more fluid from the power nozzle 31 into the outlet 37 than into the outlet 36.

The signals in the outlet 36 and the outlet 37 are transmitted to the control port 16 and the control port 17 of the bistable amplifier 11. When the signal in the control port 17 is greater than the signal in the control 16 by an amount equal to the switching threshold of the bistable amplifier 11, the fluid stream flowing through the outlet 19 transfers into the outlet 20.

The system 10 is symmetrical so that the switching process repeats and the fluid stream is caused to switch from outlet 20 back into outlet 19. That is, a portion of the fluid flows into the outlet passage 26 through the fluidic restriction 25 and through the passage 24, but a portion of the fluid also flows through the passage 70, through the fluidic resistance 71, and through the passage 72 into the fluidic capacitance chamber 73. The pressure within the fluidic capacitance chamber 73 slowly increases, causing a corresponding increase in the control pressure at the fourth control port 35 of the proportional fluidic amplifier 13. This increase in pressure at the control port 35 results in more fluid from the power nozzle 31 being directed into the outlet 36 than into the outlet 37.

The fluid at the outlet 36 is transmitted to the control port 16 of the bistable amplifier 11 through the passage 50; the fluid at the outlet 37 is transmitted to the control port 17 of the bistable amplifier 11 through the passage 51. When the signal at the control port 16 is stronger than the signal at the control port 17 by an amount equal to the switching threshold of the bistable amplifier 11, the fluid stream switches from outlet 20 into outlet 19. The switching process then repeats, as described previously.

The frequency at which the bistable amplifier 11 oscillates depends upon various parameters including the value of the fluidic resistance 61, the value of the fluidic resistance 71, the value of the fluidic capacitance chamber 63, the value of the fluidic capacitance chamber 73, and the gain of the proportional fluidic amplifier 13.

To understand the operation of this system more fully, let us assign values to the pressure signals within the system. These values are not necessarily actual values, but are merely used for the purpose of explaining the system operation.

If the fluid stream is in the outlet 19, assume that there is a 5 p.s.i. signal in the passage 60, which causes fluid to flow through the passage 60, through the fluidic resistance 61, through the passage 62 and into the fluidic capacitance chamber 63. The fluidic resistance 61 limits the rate of rise of the pressure within the fluidic capacitance chamber 63; that is, the pressure in the fluidic capacitance chamber 63 slowly increases from its initial value which we assume is zero. Further, let us assume that the gain of the proportional fluidic amplifier is five. For example, two-tenths of a p.s.i. pressure differential input signal between the control port 34 and the control port 35 produces a differential output signal of 1 p.s.i; between the outlet 36 and the outlet 37. Also, assume that the switching threshold of the bistable amplifier is 1 p.s.i; that is, when the pressure in the control port 16 is 1 p.s.i. larger than the pressure in control port 17, the power stream switches from the outlet 20 into the outlet 19. Conversely, when the pressure in the control port 17 is 1 p.s.i. greater than the pressure in the control port 16, the fluid stream switches from the outlet 19 into the outlet 20.

As the pressure within the fluidic capacitance chamber 63 increases to two-tenths of a p.s.i., the proportional fluidic amplifier 13 amplifies by five the differential input signal of two-tenths of a p.s.i. between the control port 34 and the control port 35. Thus, the amplifier 13 produces pressure signal at the outlet 37 which is 1 p.s.i. greater than the pressure signal at the outlet 36 (assuming that the value of the pressure in the control port 35 is zero). The 1 p.s.i. differential signal between the outlet 37 and the outlet 36 is transmitted to control ports 17 and 16 of the bistable amplifier 11. We assume that the switching threshold of the bistable amplifier 11 is 1 p.s.i., so that when the pressure in the control port 17 is 1 p.s.i. greater than the pressure in the control port 16, the bistable amplifier fluid power stream switches from the outlet 19 into the outlet 20. Since the pressure is 1 p.s.i. greater in the control port 17 than in the control port 16, the fluid stream switches from the outlet 19 into the outlet 20. Further, since the system is symmetrical, switching repeats on the other half of the feedback system. A 5 p.s.i. signal in the passage 70 produces an increase in the pressure within the fluidic capacitance chamber 73. As the pressure in the fluidic capacitance chamber 73 increases to two-tenths of a p.s.i., the pressure differential signal between the control pot port 35 and the control port 34 is also two-tenths of a p.s.i. The two-tenths of a p.s.i. signal is amplified five times, producing a 1 p.s.i. differential signal between the outlet 36 and the outlet 37. The 1 p.s.i. differential signal between the control port 16 and the control port 17 switches the fluid power stream from the outlet 20 into the outlet 19.

As the fluid stream within the bistable amplifier 11 switches from a outlet, the pressure associated with the that outlet decreases to zero. Thus, when the fluid stream switches from the outlet 19 into the outlet 20, the pressure in the passage 60 decreases to zero as does the pressure within the fluidic capacitance chamber 63. However, those skilled in the art realize that the pressure within the fluidic capacitance chamber 63 and the fluidic capacitance chamber 73 need not decrease to zero. The fluidic resistance 61, the fluidic resistance 71, the impedance of the proportional fluidic 13, 13 and the output impedance of the bistable amplifier 11 can be varied to change the pressure within the fluidic capacitance chamber 63 and the fluidic capacitance chamber 73.

As the bistable amplifier power stream oscillates from outlet to outlet in the aforedescribed manner, the frequency of oscillation is constant until the system parameters affecting the feedback signal change. For example, if the fluidic resistance 61, the fluidic resistance 71, the fluidic capacitance chamber 63, the fluidic capacitance chamber 73, and the gain of the proportional fluidic amplifier 13 are kept constant, the frequency does not change. Changing any of these parameters changes the frequency of oscillation of the bistable amplifier 11. However, changing the value of the fluidic resistance 61, the fluidic resistance 71, the fluidic capacitance chamber 63, and the fluidic capacitance chamber 73 is difficult while keeping the system 10 devoid of any moving parts. By changing the gain of the proportional fluidic amplifier 13, the varying proportional input signal is converted into a varying frequency output signal.

As previously noted, the assignee has an application pending in which the variable gain aspects of proportional amplifier are discussed more thoroughly. Briefly, the pending application teaches that changes in the gain of a fluidic amplifier occur when, identical changing signals are supplied to oppositely disposed control ports of the amplifier. Utilizing this gain-changing technique, a proportional signal applied at the passage 41 flows through the restriction 42, and passage 43, into the gain-changing control port 32 and the gain-changing control port 33, thus changing the gain of the proportional fluidic amplifier 13. The restriction 42 located between passages 40 and 41 limits the flow of fluid and ensures that the flow divides equally into the gain-changing control port 32 and the gain-changing control port 33. When the fluid signal at passage 41 increases, the fluid signal in the gain-changing control port 32 and the gain-changing control port 33 correspondingly increases, which causes a change in the gain of the proportional fluidic amplifier 13. With certain types of proportional fluidic amplifiers increase in the signal at passage 41 decreases the gain of the fluidic amplifier. Let us assume that an increase in the pressure in passage 41 decreases the gain of the proportional fluidic amplifier 13 from five to two. The differential pressure signal between the control port 34 and the control port 35 must be one-half of a p.s.i. instead of two-tenths of a p.s.i. to produce the desired 1 p.s.i. differential signal between the control port 17 and the control port 16. The 1 p.s.i. differential signal switches the fluid power stream from the bistable amplifier 11 from one outlet to the other outlet. The increase in pressure from two-tenths of a p.s.i. to one-half of a p.s.i. in the fluidic capacitance chamber 63 and the fluidic capacitance chamber 73 requires a longer time. Consequently, the longer time delays the switching of the fluid stream from outlet to outlet. Hence, with delayed switching, the frequency of the oscillation of the bistable amplifier 11 decreases.

In summary, by varying the gain of the proportional fluidic amplifier 13 with a varying proportional control signal in passage 41, I have correspondingly changed the output frequency of the bistable amplifier 11, and thus changed the proportional input signal into a digital output signal.

I claim:

1. A proportional-to-frequency converter comprising:
   bistable amplifier means having input means and outlet means openable to supply a feedback signal;
   a single gain control conduit for receiving a proportional control signal;
   variable-gain fluidic amplifier means having first input means for receiving the feedback signals from said bistable amplifier means, second input means connected to said gain control conduit for receiving the proportional control signal and operable to change the gain of said variable-gain fluidic amplifier means in accordance with the proportional control signal, and outlet means;
   first means connecting said outlet means of said bistable amplifier means to said first input means of said variable-gain fluidic amplifier means; and
   further means connecting said outlet means of said variable-gain fluidic amplifier means to said input means of said bistable amplifier means and operable to provide a path for the feedback signal thereby causing said bistable amplifier to oscillate at a frequency dependent upon the gain of said variable-gain fluidic amplifier so that when the proportional control signal is changed the gain of said variable-gain fluidic amplifier means is changed causing said frequency to vary in response thereto.

2. The apparatus of claim 1 wherein said variable-gain fluidic amplifier means comprises a proportional fluid amplifier having an interaction region, a power nozzle and a pair of control ports for respectively supplying a power stream and control signals to the interaction region, Outlet means for receiving amplified fluid signals therefrom, and control input means for introducing additional fluid into the interaction region in a manner so as to change the effectiveness of the control signals in deflecting the power stream, the additional fluid alone producing no pressure differential across the power stream.

3. Apparatus of the class described comprising:
bistable amplifier means having an input and an outlet;
feedback means connecting the outlet of said bistable amplifier means to the input thereof, said feedback means effective to provide a path for a negative feedback signal from said outlet to said input to thereby cause said bistable amplifier means to oscillate at a frequency;
a single gain control conduit for supplying an analogue control signal; and
variable-gain fluid amplifier means in said feedback means, said variable-gain fluid amplifier means having an interaction region, inlet means for supplying fluid signals to the interaction region, outlet means for receiving amplified fluid signals from the interaction region, and control signal input means connected to said gain control conduit for changing the gain of said variable-gain amplifier means by changing the fluid pressure in the interaction region in a manner so that no differential output signals are caused thereby in the outlet means, the inlet means being connected for receiving signals from the outlet of said bistable amplifier means and the outlet means being connected to supply signals to the input of said bistable amplifier means, said variable gain fluid amplifier means being effective to vary the negative feedback signal in response to the analogue control signal at the control input means to thereby change the frequency of oscillation of said bistable amplifier means.

4. The apparatus of claim 3 wherein said feedback means includes a fluid resistance and a fluidic capacitance chamber.